United States Patent [19]
Cox

[11] 4,310,950
[45] Jan. 19, 1982

[54] ELEVATOR CLEANER

[76] Inventor: Donald J. Cox, Box 697, Enochs, Tex. 79324

[21] Appl. No.: 113,253

[22] Filed: Jan. 18, 1980

[51] Int. Cl.³ .................................................. D01G 1/00
[52] U.S. Cl. ............................................................ 19/202
[58] Field of Search ............... 19/202, 203, 204, 205; 209/132–141; 56/12.8, 13.3, 16.5, 16.6, 30, 36

[56] References Cited

U.S. PATENT DOCUMENTS

| | | | |
|---|---|---|---|
| 3,014,247 | 12/1961 | Salmon | 19/205 X |
| 3,035,312 | 5/1962 | Cox | 19/202 |
| 3,172,165 | 3/1965 | Helm | 19/203 |
| 3,382,544 | 5/1968 | Moore | 19/202 |
| 3,423,797 | 1/1969 | Cox | 19/202 |
| 3,425,097 | 2/1969 | Rood et al. | 19/204 X |
| 3,769,660 | 11/1973 | Schuette | 19/202 |
| 4,102,017 | 7/1978 | Foerster | 19/205 X |

*Primary Examiner*—Louis Rimrodt
*Attorney, Agent, or Firm*—Wendell Coffee

[57] ABSTRACT

Seed cotton harvested by a stripper is blown upward along a duct to an open saw cylinder. The locks of cotton are snagged on the teeth of the saws of the saw cylinder while the air passes to within the saw cylinders and out the ends of the saw cylinder. The locks of cotton knocked from the saw cylinder are reclaimed by a reclamation saw and doffed into the main duct to again be brought to the main open saw cylinder. The seed cotton is doffed from the open saw cylinder into an overhead basket of the cotton harvester.

10 Claims, 7 Drawing Figures

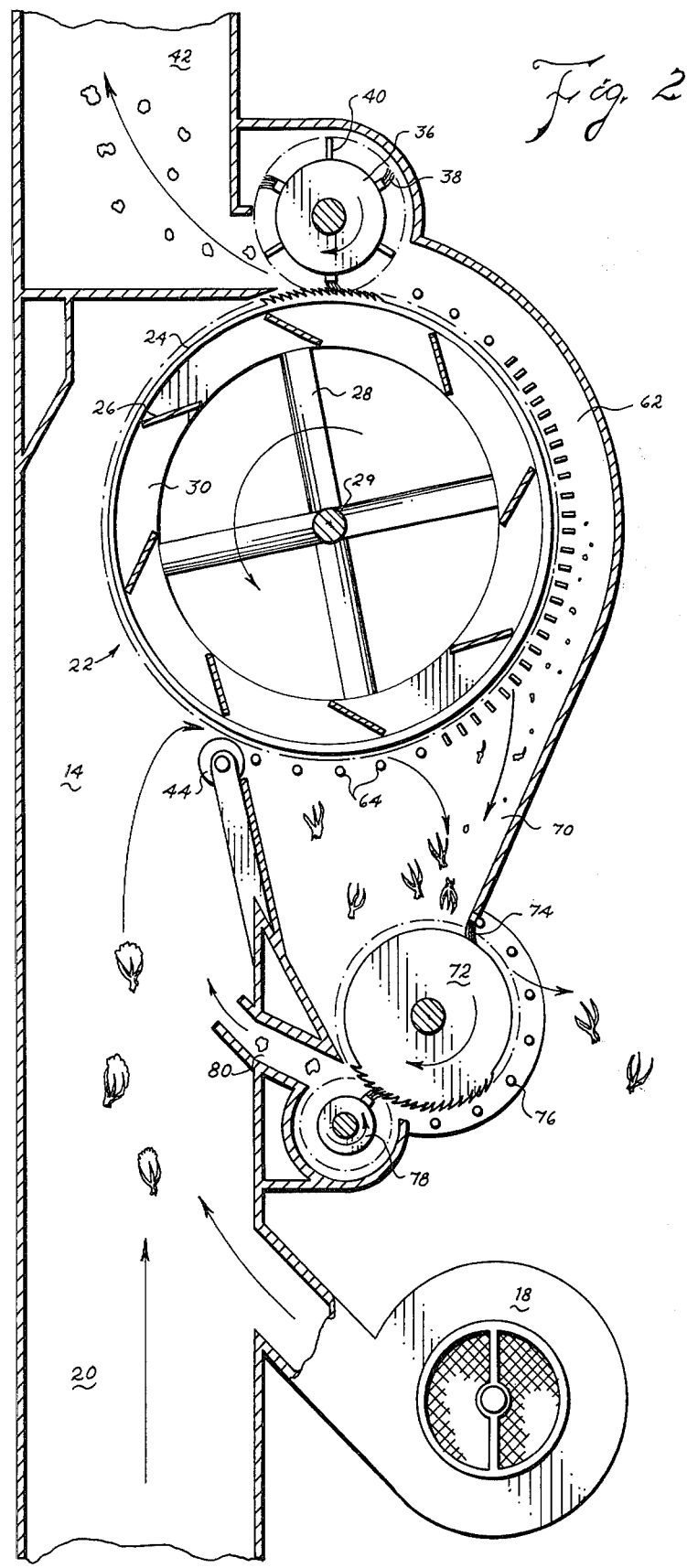

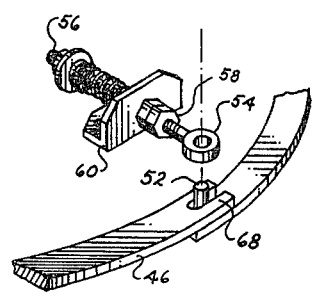
Fig. 6
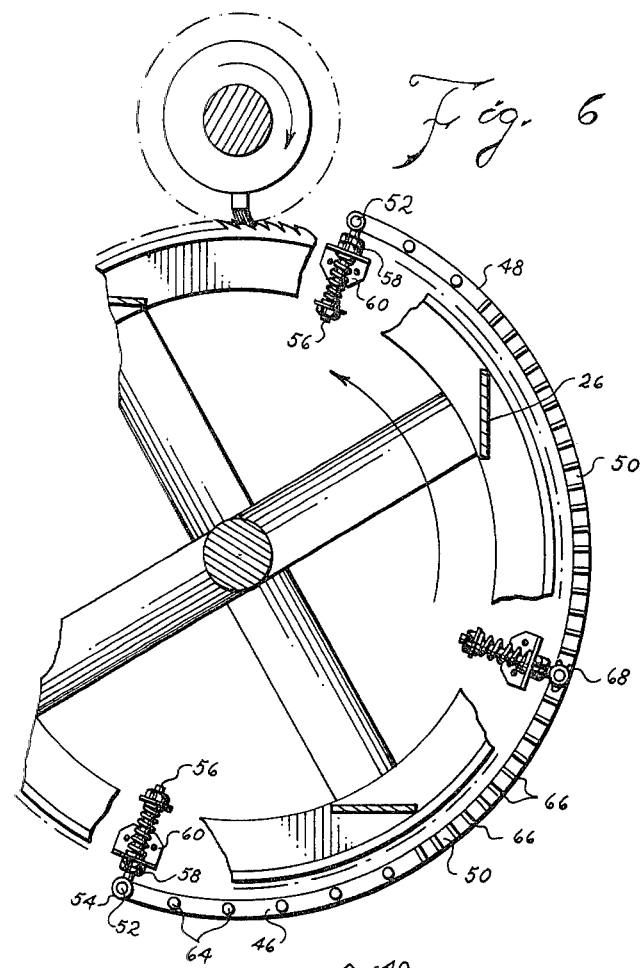
Fig. 5
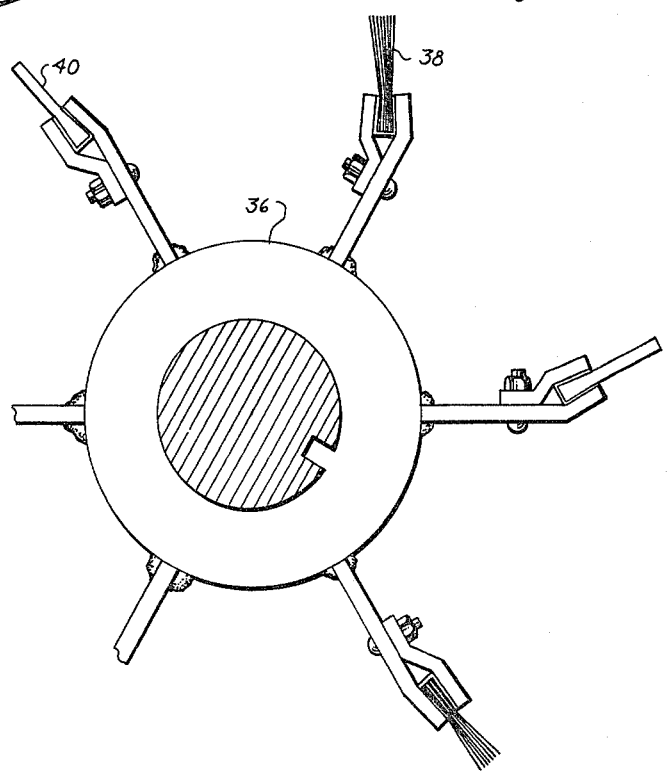
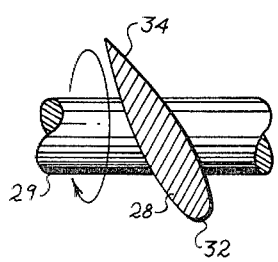
Fig. 4
Fig. 7

ELEVATOR CLEANER

BACKGROUND OF THE INVENTION (1) Field of the Invention

This invention relates to cleaning burrs, sticks and trash from harvested cotton mounted upon the same machine which carries the harvester.

(2) Description of the Prior Art

Previously, I have patented a stripper and cleaner combination. See my previous U.S. Pat. Nos. 3,035,312 and 3,423,797.

Also, it is common in the seed cotton cleaning art to snag locks of seed cotton upon a saw cylinder and brush them against knocker bars or grids to knock the burrs, sticks and trash from the locks of seed cotton and to doff seed cotton from the saw cylinders with rotating brush cylinders. Also, to pass the burrs, sticks and trash removed from the seed cotton past a reclamation cylinder to reclaim any cotton contained therein is known to the prior art.

SUMMARY OF THE INVENTION (1) New and Different Function

I have invented an improved machine and method of operation wherein the air flows through the periphery of the saw cylinder to within the cylinder thereby insuring that all locks of seed cotton are snagged by saws along the periphery.

It will be understood that cotton strippers operate at high rates and often will strip over a ton (2200 lbs) within ten minutes. Therefore, it is necessary that the cleaning mechanisms operate extremely efficiently to handle this amount of cotton within the time period allotted. Also, for the benefit of the physical arrangement of the equipment, as well as better handling of the cotton, I have found it desirable to move the reclaimed cotton into the stream of unclean cotton rather than into the stream of finished cotton as is customary.

Furthermore, I have found that a cylinder with a very large diameter will handle more cotton for a given length of cylinder than a cylinder of a smaller diameter.

OBJECTS OF THIS INVENTION

An object of this invention is to remove burrs, sticks and trash from seed cotton.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWINGS

FIG. 2 is a schematic representation mainly in section showing the improved elevator cleaner.

FIG. 4 is a sectional detail of the spokes on the axle of the main saw cylinder.

FIG. 5 is an end elevational view of the main doffing cylinder.

FIG. 6 is a sectional view of the main saw cylinder and doffing cylinder with parts broken away to show the attachment of the moveable knocker grids thereon.

FIG. 7 is a detail perspective of the connection between the ends of the two knocker segments.

DETAILED DESCRIPTION OF THE PREFERRED EMBODIMENT

Figure 1:
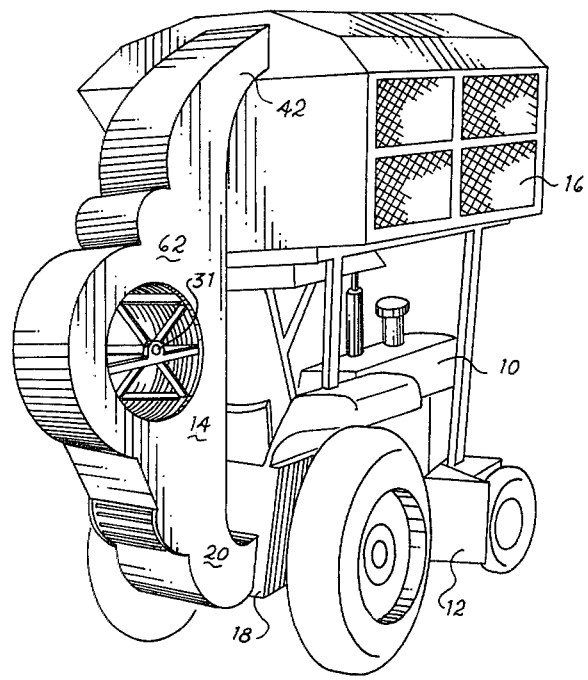
FIG. 1 is a perspective view of a cotton stripper and basket mounted upon a tractor with an elevator cleaner according to this invention.
Figure 3:
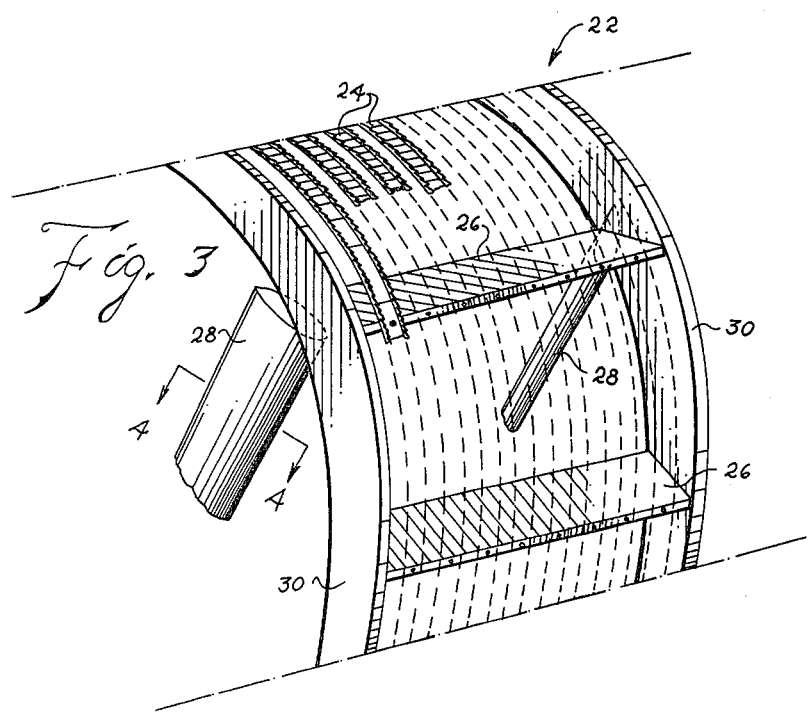
FIG. 3 is a partial perspective of the main saw cylinder showing the spaces and construction of the saw strips thereon.

Referring to the drawings, tractor 10 has cotton stripper 12 attached thereto. As is conventional, the cotton is stripped and conveyed back to elevator duct 14. The tractor also carries basket 16 upon it and the seed cotton as stripped by the strippers 12 is moved through elevator duct 14 into basket 16. Fan 18 is at the bottom of the elevator duct 14 and it takes the cotton from the stripper 12 and blows it upward. The cotton is received by the elevator duct and the lower portion of it is herein called inlet section 20.

Those having ordinary skill in the art will understand that the basic arrangements and elements described to this point are old and well known in the art.

According to my invention, the cotton in the air is carried upward to main saw cylinder 22. As may be seen, the elevator cleaner is mounted upon tractor 10 with the elevator cleaner having a longitudinal axis and its longitudinal axis extending upward. The elevator cleaner as a whole has the main saw cylinder 22 near the top and the inlet section 20 at the bottom.

The main saw cylinder 22 has saw strips 24 mounted upon peripheral longitudinal bars or plates 26. The peripheral plates are angled in the direction of rotation of the saw cylinder so that the peripheral plates act similar to fan blades to pull the air from the outside of the cylinder to the inside of the cylinder 22. The saw strips 24 are spaced apart and there is no other peripheral covering over the plates 26. Therefore, there is an open air space between the saw strips 24 so that the air can pass between the saw strips into the interior of the main saw cylinder 22. The air moves from the inside of the saw cylinder 22 out to the ambient air. The cylinder has basically the same width as the main duct 14 at this point, which would also be the width of the elevator cleaner. The ends of the saw cylinder are open to permit the expulsion of the air out the ends of the main saw cylinder which is out into the atmosphere. The drawings show a channel type saw strip, however, those having skill in the art will understand that oftentimes a single saw band is helically wound upon the cylinder and that the peripheral plates 26 could be notched to receive such bands.

Spokes 28 support the rims 30 of the main saw cylinder and are also angled outward so that they act as axial flow fan blades to push the air from the inside of the saw cylinder out into the atmosphere. Although I prefer the spokes to have a propeller like cross section, i.e., to have a rounded nose 32, with a sharpened trailing edge 34, it will be understood by those having ordinary skill in the art, they could be of other configuration. Also, in certain design configurations, it may be decided to make the spokes of no particular "fan" configuration but merely depend upon the fan 18 to move the air up through the duct and through the periphery of the saw cylinder between the saw strips 24 and out the ends of the saw cylinder into the atmosphere. However, I prefer to aid the movement of the air with the axial flow fans built into the spokes of the saw cylinder and also to aid, as much as possible, the flow of the air, by having plates 26 angled toward the direction of rotation so that they too aid in the flow of the air as described. The plates 26 are attached to the rims 30.

The spokes 28 are attached to the main cylinder axle 29 which are rotatably mounted within bearings 31 suitably supported along housing 62 of the elevator cleaning which might also be considered to be the housing of the main duct 14. The main saw cylinder is rotated in the direction as indicated in FIG. 2 by suitable drive means such as a V-belt which would be entirely within the skill of the art. The drive means for this or the other rotating elements has not been shown for clarity of the drawings and conciseness of the specification.

The seed cotton snagged upon the teeth of the saw strips 24 are carried by beater bars and on to the main doffer cylinder 36 which is mounted immediately above or at the top of the main saw cylinder 22. The doffer cylinder 36 has alternate brush strips 38 and flat strips 40, therefore, seed cotton is doffed from the main saw cylinder 22 and also it is doffed with sufficient force and carrying sufficient air with it that it is moved through basket chute 42 into the basket 16. The flat strips 40 are conveniently made of rubber reinforced with canvas and this material is commonly called "belting". However, many flexible or pliable strips of material are suitable for this purpose. The brushes 38 are well known in the art and commercially available on the market.

It will be understood that the cotton strippers will harvest cotton at a rapid rate and, therefore, it is necessary to have a high capacity saw cylinder to carry the cotton at a rapid rate. I have found, by making the diameter of the saw cylinder 22 at least 4 feet (1.2 meter) that it will carry cotton at a rate by which it is stripped from the plant. Also, I have found that passing the air blast through the saw strips aids in fully loading the saw strips and, therefore, in maintaining a high rate of movement of the cotton.

To aid in the holding of the locks of seed cotton that are snagged on the teeth of the saw, cylinder roller 44 is mounted adjacent to the main saw cylinder immediately before the saw cylinder 22 brings the cotton to the knocker bars. If a roller is not used, a brush or flap as is known in the art would be used.

The main grid of knocker bars are mounted so that the grid is easily moveable away from the saws. Two arcuate segments are used. A first segment 46 and second segment 48 are attached together by expansion joint between them so that they can move apart. This is particularly seen in FIGS. 6 and 7. Each segment is about a little over ¼ of a circle or about 95°. The segments include arcuate rims 50. Stud 52 at each end of the rim is held by loop 54 of eye bolt 56. A pair of lock nuts 58 on the eye bolt limit the inward travel of the segments 46 and 48 against bracket 60. The brackets are conveniently attached to the housing 62 of the elevator cleaner. The first segment 46 includes about six widely spaced cross rods 64. These are widely spaced apart so that sticks and burrs can readily pass between them as the cotton is knocked against them. Following behind these are closely spaced knocker bars 66 for the removal of trash and the like.

The end of the first segment is bifurcated at 68 so that it slides over the stud 52 in the end of the leading edge of the second segment 48. Therefore, it may be seen as the segments may move back and forth from the saws as wads of cotton or stumps or rocks may pass through it is possible for them to expand outward.

As the burrs, sticks and trash are knocked free from the teeth of the saw strips 24, they are caught in burr chute 70 which terminates at the reclamation saw cylinder 72. The reclamation saw cylinder likewise has a brush or flap 74 to aid in getting the material against the reclamation saw 72 so that the teeth of the saw may reclaim any locks of seed cotton found therein. However, burrs and the like which might be therein readily pass through widely spaced reclamation knocker rods 76. These burrs, sticks and trash are expelled directly outside of the elevator cleaner, i.e., back upon the land from which the cotton was harvested. Any cotton reclaimed by the reclamation saw is doffed by reclamation doffer cylinder 78. The doffed seed cotton goes through reclamation chute 80 back into the main duct 14 with the harvested seed cotton going to the main saw cylinder 22.

The embodiment shown and described above is only exemplary. I do not claim to have intended all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

| | |
|---|---|
| 10 tractor | 44 roller |
| 12 stripper | 46 first segment |
| 14 duct | 48 second segment |
| 16 basket | 50 rims |
| 18 fan | 52 stud |
| 20 inlet section | 54 loop |
| 22 main saw cylinder | 56 eye bolt |
| 24 saw strip | 58 lock nut |
| 26 plate | 60 bracket |
| 28 spoke | 62 housing |
| 29 axle | 64 rods |
| 30 rims | 66 bars |
| 31 bearing | 68 bifurcated |
| 32 nose | 70 burr chute |
| 34 trailing edge | 72 reclamation saw |
| 36 doffer cylinder | 74 brush |
| 38 brush strips | 76 reclamation rods |
| 40 flap strips | 78 reclamation doffer |
| 42 basket chute | 80 reclamation chute |

SUBJECT MATTER CLAIMED FOR PROTECTION

I claim as my invention:

1. A cleaner to remove burrs, sticks and trash from seed cotton comprising:
   a. an inlet duct terminating at
   b. a saw cylinder,
   c. a knocker grid adjacent the cylinder to knock burrs, sticks and trash therefrom, d. a doffer adjacent the cylinder to doff cleaned seed cotton from the cylinder, and e. saw strips attached to the periphery of the cylinder with spaces between the strips, thus forming air passages between the strips whereby air may flow from the inlet duct through the periphery of the cylinder to within the cylinder and out to the atmosphere, and f. fan means operatively connected to the cleaner for moving the air as stated above.

2. The invention as defined in limitations a. through f. of claim 1 further comprising:

g. longitudinal bars along the periphery of the saw cylinder to attach the saws, h. said bars plate-like and angled so that they act as fan blades to aid in pulling air into the saw cylinder.

3. An elevator cleaner with a longitudinal axis adapted to be operatively associated with a cotton harvesting means and a cotton basket comprising:

a. the elevator cleaner mounted with its longitudinal axis extending upward, b. the elevator cleaner including an inlet section at the lower end to receive air and seed cotton from the harvesting means, c. a main saw cylinder near the top of the elevator cleaner, d. a fan for moving the seed cotton from the inlet section to the main saw cylinder, e. a main doffer cylinder to doff the cotton from the main saw cylinder and into the basket, f. a knocker grid adjacent the main saw cylinder to knock burrs, sticks and trash from the seed cotton on the saw cylinder, g. a burr chute below the knocker grid to receive burrs, sticks and trash, h. a reclamation saw cylinder at the bottom of the burr chute, i. a reclaim doffer to doff reclaimed cotton from the reclamation saw cylinder into the elevator cleaner between the inlet section and main saw cylinder, and j. an open reclamation grid adjacent the reclamation saw cylinder to knock burrs, sticks and trash therefrom.

4. The invention as defined in limitations a. through j. of claim 3 wherein k. the main doffing cylinder has alternate brushes and flexible pliable flaps to doff the cotton from the main saw cylinder and into the basket.

5. The invention as defined in limitations a. through j. of claim 3 wherein k. the knocker grid
(i) is mounted for movement away from the saw cylinder, and
(ii) is spring biased toward the saw cylinder.

6. The invention as defined in limitations a. through j. of claim 3 wherein k. said main saw cylinder is open so that there are spaces between the saws and air can pass from the outside of the main saw cylinder through its peripheral surface to within the main saw cylinder; and l. the air flow is from the inlet section, up the elevator cleaner through the main saw cylinder and out to the atmosphere.

7. The invention as defined in limitations a. through j. of claim 3 wherein k. the saw cylinder is over 1.2 meters in diameter.

8. The invention as defined in limitations a. through k. of claim 7 wherein l. said main saw cylinder is open so that there are spaces between the saws and air can pass from the outside of the main saw cylinder through its peripheral surface to within the main saw cylinder; and m. the air flow is from the inlet section, up the elevator cleaner through the main saw cylinder and out to the atmosphere.

9. The invention as defined in limitations a. through m. of claim 8 wherein n. the knocker grid
(i) is mounted for movement away from the saw cylinder, and
(ii) is spring biased toward the saw cylinder.

10. The invention as defined in limitations a. through n. of claim 9 wherein o. the main doffing cylinder has alternate brushes and flexible pliable flaps to doff the cotton from the main saw cylinder and into the basket.

* * * * *